ns are to be provided.

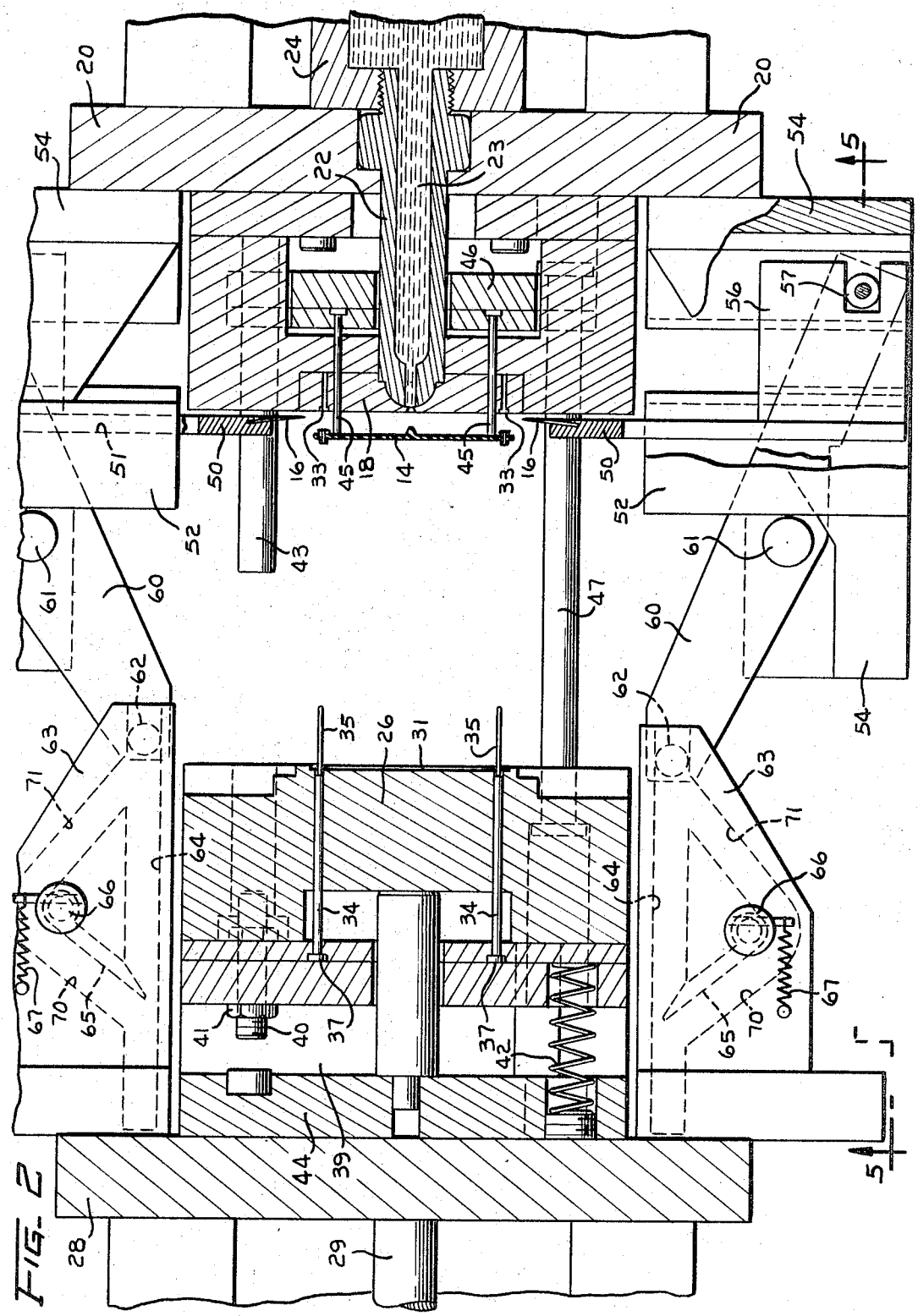

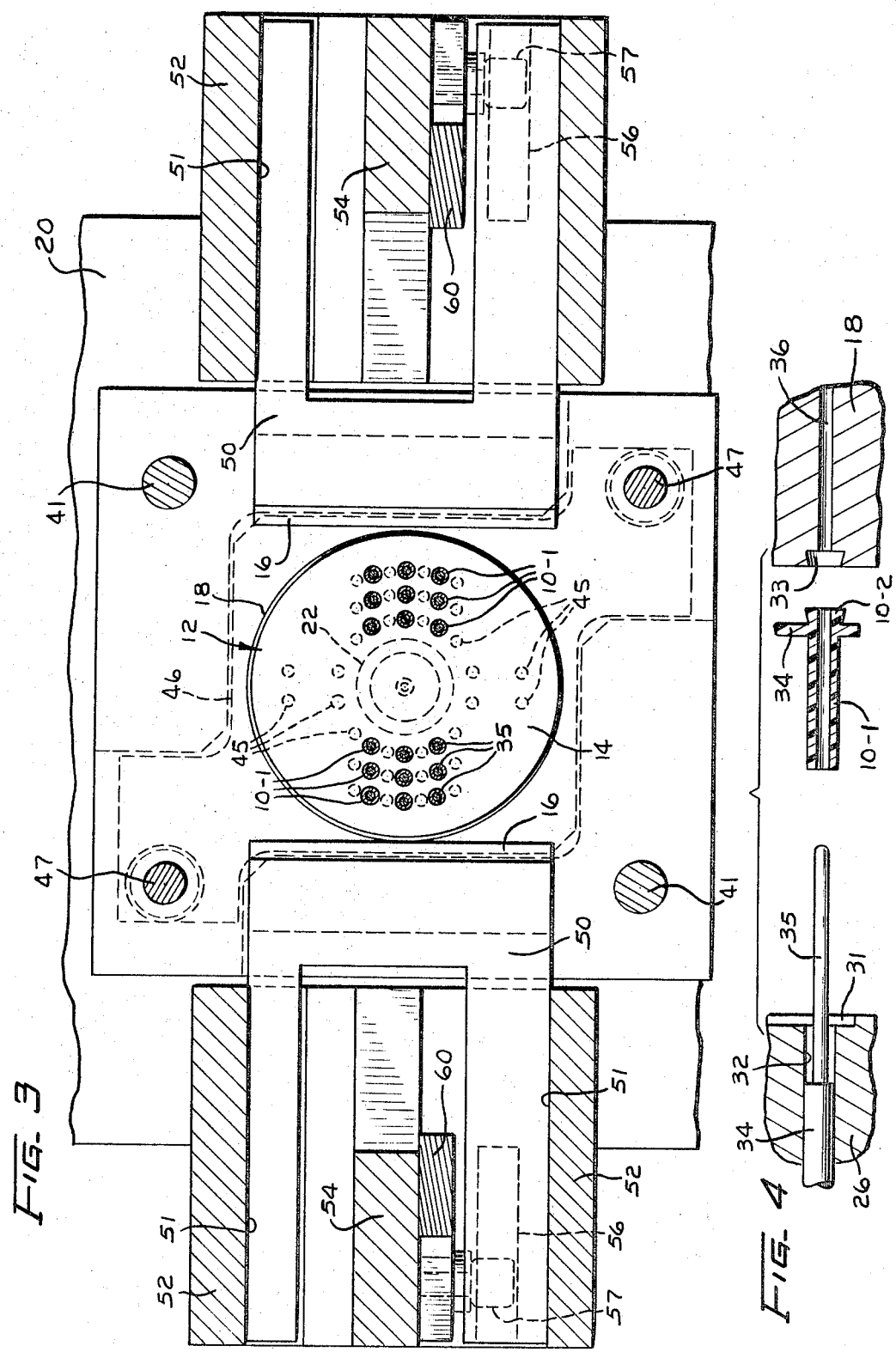

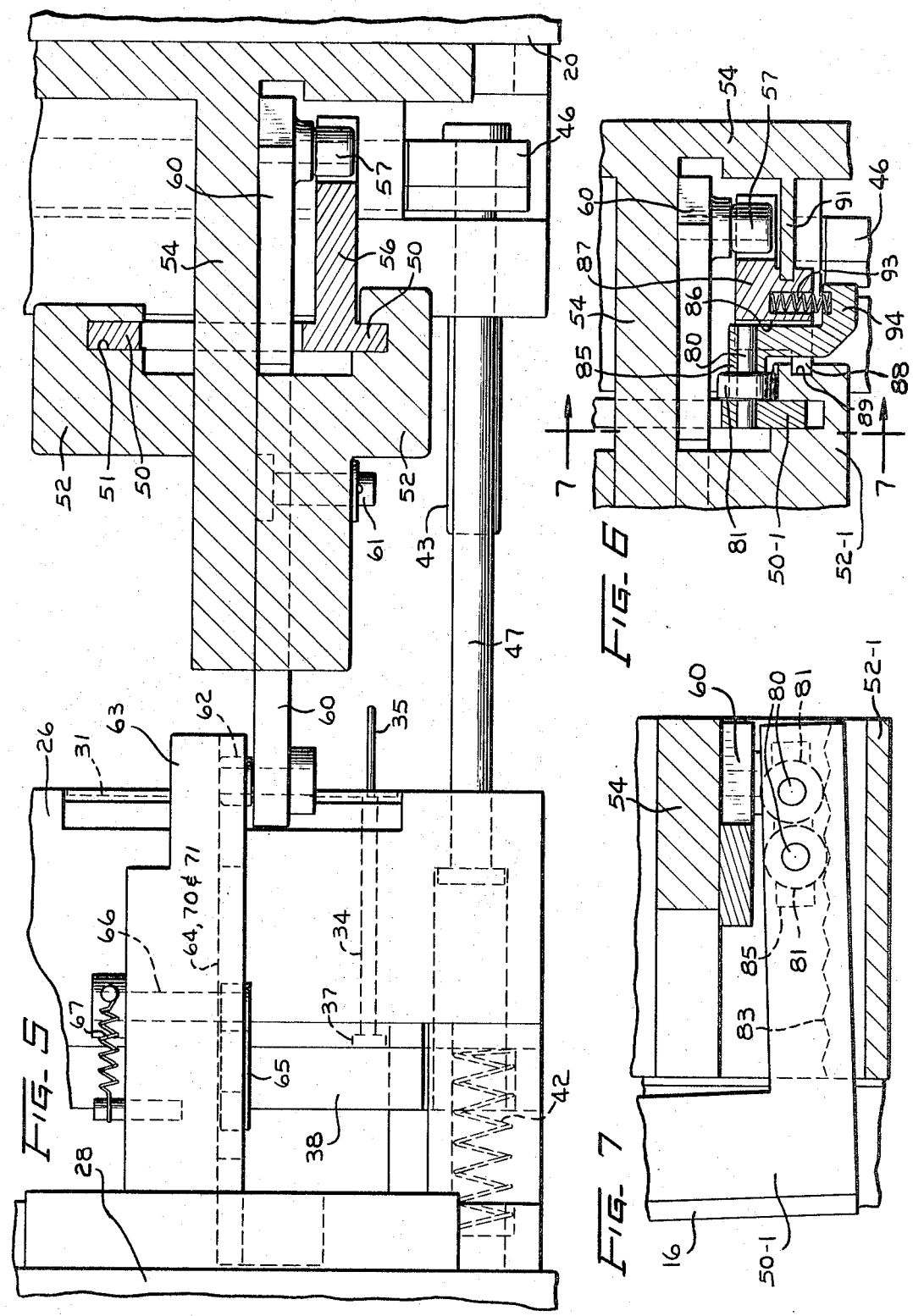

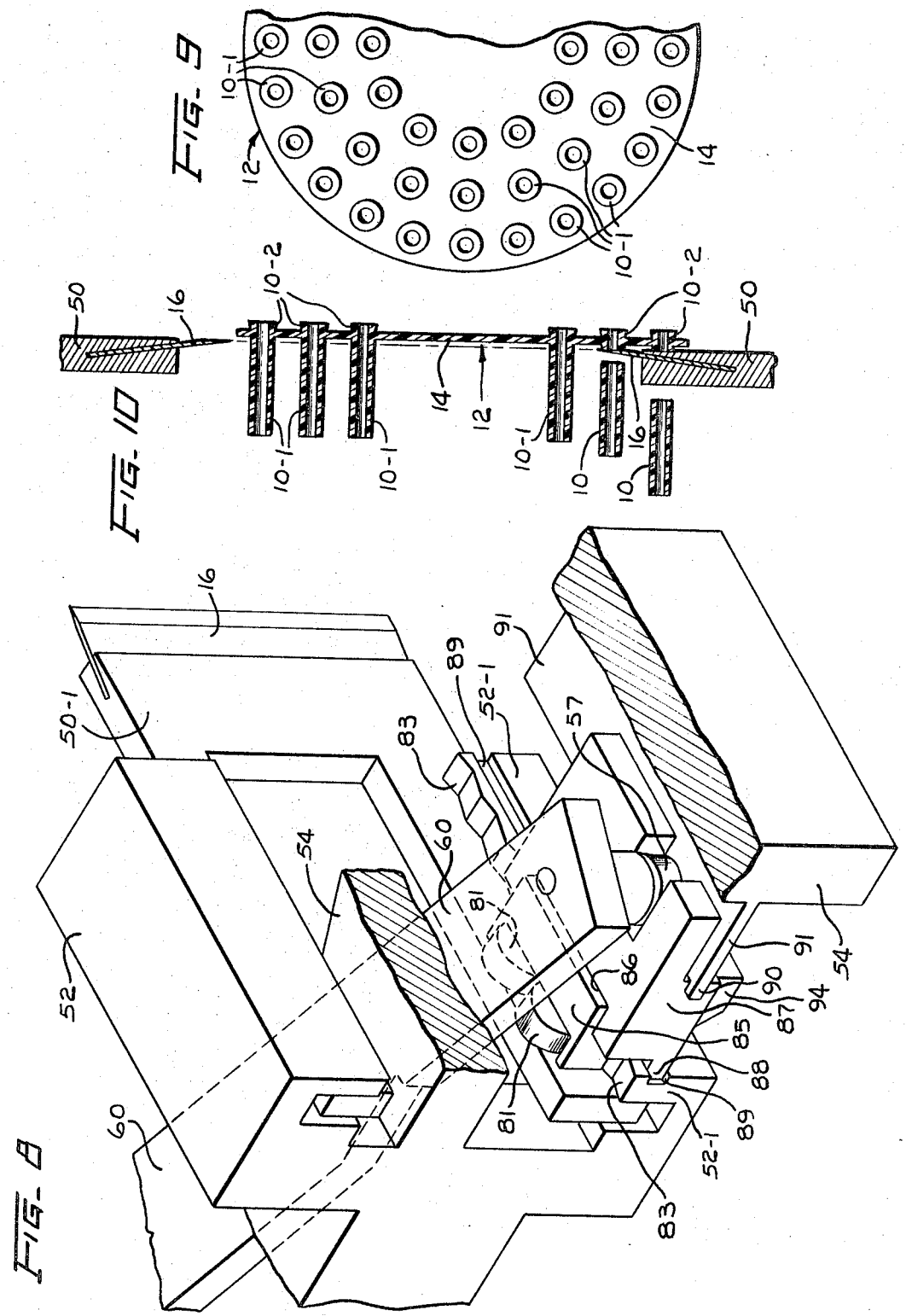

United States Patent Office 3,317,961
Patented May 9, 1967

3,317,961
APPARATUS FOR FORMING PARTS
Constantine N. Drevalas, Wheaton, and Theodore W. Kalbow, Berwyn, Ill., and James H. Tomlin, Fort Lauderdale, Fla., assignors to Western Electric Company, New York, N.Y., a corporation of New York
Filed Dec. 6, 1963, Ser. No. 328,702
9 Claims. (Cl. 18—30)

This invention relates to an apparatus for making parts of dielectric material, and more particularly to an apparatus for making sleeves by molding a plurality of parallel tubular elements interconnected at one end by a flat sprue and shearing the sleeves from the sprue.

In the fabrication of some types of multi-contact switches wherein pile ups of flat contact springs are supported in superposed relation to each other, it is necessary to provide sleeves of dielectric material to electrically insulate the individual apertured contact springs from the shanks of the bolts or screws used to secure the contact springs in assembled relationship. Because of the large variations in the heights of the pile ups of the contact springs, it is necessary to have corresponding supplies of insulating sleeves of various lengths.

Objects of the invention are to provide an effective and efficient apparatus for making tubes of dielectric material.

Other objects of the invention are to provide an adjustable apparatus for molding a plurality of members of different lengths interconnected by a flat sprue and for severing the members from the sprue before the latter is ejected from the molding apparatus.

An apparatus illustrating certain features of the invention may include cooperable relatively movable molding die sections for molding a plurality of sleeves in parallel and laterally spaced relation to one another and interconnected at one end by a flat sprue, and one or more shearing members and actuating mechanisms therefor mounted on the die sections and operable in response to the movement of the die sections to open position for shearing the sleeves from the sprue while the sprue is releasably held in one of the die sections prior to the ejection of the sprue from the die.

Other objects, advantages and novel aspects of the invention will become apparent upon consideration of the following detailed description in conjunction with the accompanying drawings, in which:

FIG. 2 is a plan sectional view of the apparatus similar to FIG. 1 showing the molding die sections in open position and the shearing members in retracted position after they have been actuated to shear the sleeves from a flat sprue and have been returned to retracted position in response to the opening movement of the movable die section;

FIG. 3 is a vertical cross-sectional view through the apparatus taken on line 3—3 of FIG. 1;

FIG. 4 is an enlarged fragmentary view of the molding dies in separated relation to each other and to a molded sleeve;

FIG. 5 is a fragmentary side elevational sectional view of the apparatus taken on line 5—5 of FIG. 2 with the molding die sections in open position;

FIG. 6 is a fragmentary vertical longitudinal cross-sectional view of the apparatus showing a modified embodiment of the mechanism for actuating the shearing blades;

FIG. 7 is a fragmentary cross-sectional view of the apparatus taken on line 7—7 of FIG. 6;

FIG. 8 is an enlarged perspective view of a portion of the apparatus showing the modified embodiment of the mechanism for actuating the shear blades;

FIG. 9 is a fragmentary front view of the molded composite article showing the arrangement of the sleeves molded integral with a flat sprue; and FIG. 10 is a diagrammatic horizontal sectional view showing the molded composite article and a pair of shear blades for severing the sleeves from the sprue.

Figure 1:
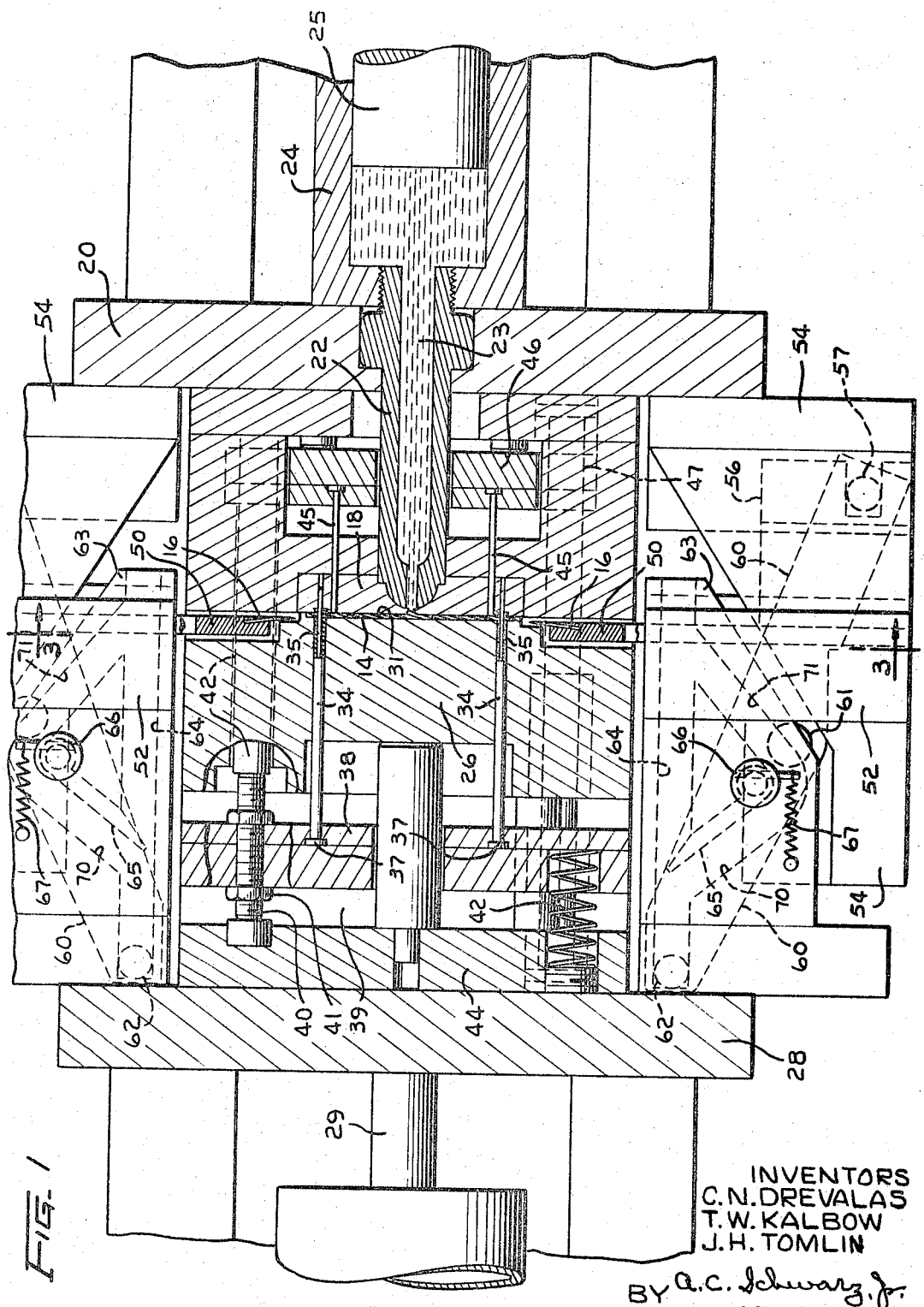
FIG. 1 is a plan sectional view of the apparatus for molding sleeves of dielectric material showing the molding die sections of the apparatus in closed position and showing the shearing blades in retracted position.

The method of making sleeves 10 of dielectric material which utilizes the present apparatus comprises molding a composite article 12 (FIGS. 9 and 10) having a plurality of tubular members 10–1 molded in parallel and closely spaced relation to one another in a mold cavity formed by a pair of relatively movable molding die sections, the tubular members 10–1 being interconnected adjacent one end thereof by a flat sprue or web 14 molded integral therewith. Enlarged end portions 10–2 of the tubular members (FIG. 4) project slightly beyond the flat sprue 14 to releasably anchor the molded article 12 in the stationary die section as the movable die section is moved therefrom leaving the tubular portions 10–1 accessible so that one or a plurality of shear blades 16 may be moved parallel to and adjacent the sprue 14 to shear the tubular members 10–1 and sever the sleeves 10 therefrom.

Referring now particularly to FIGS. 1 and 2 which show the apparatus in two different positions, the stationary molding die section, indicated at 18, is secured to a stationary platen 20 of an injection molding machine and cooperates with a nozzle 22 through which a thermoplastic molding material 23 is injected from a cylinder 24 by a piston 25. A movable die section 26 is fixed to a movable platen 28 which is reciprocated by a ram 29 to and from closed and open positions as shown respectively in FIGS. 1 and 2.

With the movable die section in closed position (FIG. 1), the molding material is injected into a disc-like sprue-forming cavity formed by a shallow recess 31 in the movable die 26 and into a plurality of sleeve-forming apertures 32 and 33 in the movable and fixed dies 26 and 18, respectively. Core pins 34 are slidably mounted in the apertures 32 in the movable die section 26 and have end portions 35 of reduced diameter which cooperate with the apertures 32 and 33 in the movable and stationary die sections to form the tubular members 10–1. The end portions of the apertures 33 in the stationary die section 18 are undercut as indicated in FIG. 4 so as to form the slightly enlarged ends 10–2 on the tubular members 10–1 for yieldably retaining the article 12 in the stationary die section 18 while the movable die section 26 is being moved therefrom, as stated hereinabove. Bores 36 of reduced diameter in the stationary die 18 provide clearance for the portions 35 of the core pins.

The headed ends 37 of the core pins 34 are secured to a plate 38 which is mounted for longitudinal movement in a space 39 of the movable die section 26 and has a pair of threaded rods 40 adjustably mounted thereon and secured in adjusted position by lock nuts 41. With the die sections 18 and 26 in open position, the pin carrying plate 38 is urged to the right as viewed in FIG. 2 by springs 42. When the die sections 18 and 26 are moved to closed position, the rods 40 are engaged by reset pins 43 secured to and extending from the stationary die section 18 and moved and held thereby against a stop plate 44 (FIG. 1) secured to the platen 28.

By adjusting the rods 40 on the pin supporting plate 38 the position of the core pins 34 may be adjusted relative to the movable die section 26 to vary the length of the sleeve-forming cavities formed therein. Thus, tubular members 10–1 of various lengths may be molded on the part 12 from which sleeves 10 of different lengths may be severed.

Knockout pins 45 are slidably supported in the stationary die section 18 to eject the flat sprue 14 on completion of the molding and sleeve severing operations. The pins 45 are secured to a plate 46 which is spring-urged to a normal retracted position and is connected to the movable die section 26 through headed rods 47 having a lost motion connection therewith for actuation in response to the movement of the die section 26 to open position.

The shear blades 16 (FIGS. 1 to 3 and 10) are secured to vertically disposed plates 50 that are slidable in guideways 51 in guide members 52 (FIG. 5) along a horizontal path parallel and in close proximity to the vertical end face of the stationary die 18 and to the sprue 14. The guide members 52 are fixedly attached to and form part of supporting brackets 54 that are secured to the stationary platen 20. In one embodiment of the apparatus, as shown in FIGS. 1 to 5, the shear plates 50 have horizontally disposed arms 56 which are operatively connected by pin and slot connections 57 to the ends of levers 60. The levers 60 are mounted intermediate their ends on the supporting brackets 54 for pivoted movement about vertical pivot pins 61. As indicated in FIG. 5, the shear blades supporting plates 50 are of U-shape to provide a clearance for movement of the plates 50 relative to the levers 60 and the brackets 54.

Rollers 62 on the other ends of the levers 60 ride in cam tracks in cam members 63 secured to the movable platen 28. During the movement of the die section 26 from open position (FIG. 2) to closed position (FIG. 1), the rollers 62 ride along the straight portions 64 of the cam tracks and actuate and move past hinged track members 65 that are attached to vertical pivot pins 66 for pivotal movement therewith. The pins 66 are supported in the cam members 63 and are stressed for rotation by springs 67 to move the hinged track member 65 to normal operative positions as shown in FIG. 2. In the closed position of the die sections 18, 26 the rollers 62 are at the opposite ends of the straight track portions 64 as indicated in FIG. 1.

In response to opening movement of the die section 26, the rollers 62 are caused to move along the longitudinal track portions 64 into engagement with the projecting end of the hinged track members 65 and be deflected thereby outwardly from each other and guided along the sloping members 65 in the sloping portion 70 of the track. This rocks the levers 60 in opposite directions to effect the inward movement of the shear blades 16 in a straight line and the shearing of the sleeves 10 from the sprue 14. The severed sleeves 10 drop into a suitable receptacle therefor (not shown). As the movable die 26 continues its movement to open position the rollers 62 are moved inwardly in opposite directions as they move along the sloping track portion 71 and rock the levers 60 in the reverse direction to effect the return of the shear blades 16 to their normal retracted positions.

One roller 62 and the cam track 63 associated therewith are offset longitudinally of the dies 18, 26 with respect to the other roller 62 and the associated cam track so as to effect the movement of one of the shear blades 16 to the end of its shearing stroke and slighlty beyond a vertical plane through the axis of the sprue and along a portion of the return stroke before the other shearing blade is moved to the end of its shearing stroke. In this manner, the shearing strokes are offset and overlap to insure the complete shearing of all of the sleeves 10 from the sprue member 14 without interference from one another.

On completion of the sleeve shearing operation and as the movable die section 26 approaches the end of its opening movement, it picks up the headed rods 47 to effect the actuation of the plate 46 and the knockout pins 45 to eject the sprue member 14 from the stationary die section 18 and allow it to drop into a receptacle (not shown). The movable die section 26 is then actuated to closed position and the apparatus is in condition for the following cycle of operation.

In a modified embodiment of the shear blade actuating mechanism, shown in FIGS. 6 to 8, a rocking movement in a vertical plane is imparted to the shear blades 16 as they are moved horizontally parallel to the sprue 14 to facilitate the severance of the sleeves 10 from the sprue 14. Each of the shear blade supporting plates 50–1 has secured thereto a pair of pins 81 on which rollers 80 are mounted for rotation. The rollers 80 rest on and cooperate with a sinuous cam track 83 formed on the lower portion of the guide 52–1 of the supporting bracket 54 for rocking the shear plate 50–1 up and down as it advances to effect an oscillatory slicing and shearing action of the shear blade 16. The other ends of the pins 81 of each of the shear plates 50–1 are secured to a block 85 which is thus secured by the pins 81 to the shear plate 50–1.

A portion of the block 85 fits in a vertical slot 86 in a slide 87 for up and down movement. As shown in FIG. 6, and particularly in FIG. 8, the slide 87 at one side thereof has a laterally directed tongue 88 slidable in a horizontal groove 89 in the guide 52–1 and the slide 87 at the other side thereof has a groove 90 for receiving a tongue 91 extending horizontally from the bracket 54 for supporting the slide 87 for horizontal movement along a path parallel to the face of the stationary die 18. A plurality of springs 93 seated in recesses in the slide 87 engage seats on a laterally directed lug 94 on the block 85 to urge the block 85, the rollers 80 and the shear plate 50–1 downwardly to maintain the rollers 80 in engagement with the sinuous cam track 83.

A rectangular slot 95 (FIG. 8) is provided in the slide 87 for receiving a roller 96 on the lever 60 to form a connection between the slide and the lever for effecting the reciprocation of the slide in response to oscillatory movement of the lever. The arrangement of the parts is such that in response to actuation of the levers 60, the slides 87 are moved horizontally toward and away from each other and cause the shearing plates 50–1 and the shear blades 16 thereon to be moved horizontally toward and away from each other, during which horizontal movement the rollers 80 ride up and down on the sinuous cam surfaces of the cam tracks 83 and impart an oscillatory cutting action to the shear blades 16 to effect the shearing of the sleeves 10 from the sprue 14.

From the foregoing disclosure, it will be seen that a novel apparatus has been devised for fabricating sleeves of dielectric material wherein a plurality of tubular members are molded in parallel and closely spaced relation to each other as part of a composite article and with the tubular members interconnected at one end by a flat web or sprue, wherein the apparatus is adjustable so as to mold tubular members of various lengths, and wherein the tubular members are sheared along a plane adjacent and parallel to the sprue while the article is still yieldably retained in the molding apparatus to sever the sleeves from the sprue prior to the ejection of the latter from the molding apparatus.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for making parts which comprises:
   a pair of relatively movable die sections cooperable in a closed position to form a mold cavity for molding an article having a flat web and a plurality of parts extending from the web in parallel and laterally spaced relation to each other, and for retaining the molded article in one of the die sections with the parts accessible during relative movement between the die sections to open position;

means for effecting relative movement between said die sections to open position;

shearing means mounted for movement transversely of said one die section and parallel and adjacent to the web of the molded article supported thereby; and means operable in response to relative movement of the die sections toward open position for actuating said shearing means to effect the shearing of the parts from the web.

2. An apparatus for making parts which comprises:

a pair of relatively movable molding die sections having substantially flat parting faces and cooperable in a closed position to form a mold cavity for molding an article having a web disposed parallel to said parting faces and a plurality of parts extending from the web in parallel and laterally spaced relation to one another and with the molded article adapted to be retained by one of said molding dies with the parts accessible as the dies are moved to open position;

means for effecting relative movement between said dies to open and closed positions;

a shear blade mounted for movement in a plane parallel and adjacent to said web and said parting face of said one die for shearing the parts from the web;

mechanism operable in response to relative movement between said dies toward open position for advancing said shear blade to effect the severance of the parts from the web; and means for effecting an oscillatory movement of the shear blade as it advances in said plane.

3. An apparatus for fabricating parts which comprises:

a stationary die section and a movable die section cooperable in a closed position to form a die cavity for molding an article having a flat web and a plurality of parts extending from the web in parallel and laterally spaced relation to each other and with projections on the article adapted to cause the article to be yieldably retained on said stationary die with the parts accessible as said movable die section is being moved to open position;

means for actuating said movable die section to and from closed and open positions;

a pair of shear blades mounted on opposite sides of said die cavity for movement toward and away from each other in a plane parallel and adjacent to the web of the article supported by said stationary die section for shearing the parts from the article; and mechanism individual to said shear blades operable in response to the movement of the movable die section from closed toward open position for reciprocating said shear blades toward and away from each other to and slightly beyond a point in said plane with one of said shear blades in advanced relation to the other to effect the shearing of the parts from the web.

4. An apparatus for fabricating parts which comprises:

a stationary molding die and a movable molding die having substantially flat parting faces and cooperable in a closed position to form a mold cavity for molding an article having a web disposed parallel to said parting faces and a plurality of parts extending from the web in parallel and laterally spaced relation to each other and for forming projections on the article for releasably retaining the article on the stationary molding die as the movable die is being moved to open position;

means for moving said movable die to and from open and closed positions;

a shear blade mounted for movement parallel and adjacent to the parting face of said stationary die and the web of the article;

cam means mounted for reciprocatory movement with said movable die; and means operated by said cam means for actuating said shear blade to effect the severance of the parts from the web during the movement of said movable die to open position.

5. An apparatus for fabricating parts which comprises:

a pair of die sections mounted for relative movement along an axis to open and closed positions and cooperable in closed position to form a flat sprue opening transversely of said axis, one of said die sections being shaped to yieldably retain the sprue during the movement of said die sections to open position, and the other die section having a plurality of apertures therein disposed parallel to said axis and communicating with said sprue opening for forming the parts therein;

core pins adjustably mounted in said apertures for defining end portions of said parts;

means for adjusting said core pins axially in said apertures;

means for effecting the relative movement of said die sections to and from open and closed positions;

shearing means mounted on said one die section for movement transversely of said axis and adjacent to said sprue for shearing the parts from the sprue; and means responsive to the movement of said die sections toward open position for actuating said shearing means to effect the serverance of the parts from the sprue.

6. An apparatus for fabricating parts which comprises:

a pair of die sections mounted for relative movement along an axis to open and closed positions and cooperable in closed position to form a flat sprue opening transversely of said axis, one of said die sections having recesses to form projections on the sprue for yieldably retaining the sprue during the movement of said die sections to open position, and the other die section having a plurality of apertures therein disposed parallel to said axis and communicating with said sprue opening for forming the parts therein;

core pins adjustably mounted in said apertures for defining end portions of said parts;

means for adjusting said core pins axially in said apertures;

means for effecting relative movement between said die sections to and from open and closed positions;

a shearing blade mounted on said one die section for movement transversely of said axis and adjacent to said sprue for shearing the parts from the sprue;

cam means mounted on said movable die section;

means actuated by said cam means in response to the first portion of the movement of said die sections to open position for actuating said shear blade to effect the severance of the parts from the sprue; and means responsive to the latter portion of the movement of said die sections to open position for ejecting the sprue from said one die section after the shearing of the parts from the sprue.

7. An apparatus for fabricating sleeves which comprises:

a stationary die section;

a movable die section mounted for movement along an axis toward and away from said stationary die to closed and open positions, said die sections cooperating in closed position to form a substantially flat sprue opening transversely of said axis, said movable die having a plurality of apertures therein disposed parallel to said axis and communicating with said sprue opening for defining the outer periphery of the sleeves;

core pins slidably mounted in said apertures and having end portions of reduced diameter cooperable with the walls of said apertures to form sleeve-forming cavities, said stationary die having apertures for receiving the reduced end portions of said core pins and having recesses for forming projections on the sprue so as to yieldably retain the sprue during the movement of the movable die section to open position;

means for adjusting the core pins axially;

means for actuating the movable die to open and closed positions;

shearing means mounted on said stationary die section for movement transversely of said axis along a path parallel and adjacent to the sprue; and means operable in response to movement of said movable die section toward open position for actuating said shearing means to effect the shearing of the sleeves from the sprue.

8. An apparatus for fabricating sleeves which comprises:

a stationary die section;

a movable die section mounted for movement along an axis toward and away from said stationary die to closed and open positions, said die sections cooperating in closed position to form a substantially flat sprue opening transversely of said axis, said movable die having a plurality of apertures therein disposed parallel to said axis and communicating with said sprue opening for defining the outer periphery of the sleeves;

core pins slidably mounted in said apertures and having end portions of reduced diameter cooperable with the walls of said apertures to form sleeve-forming cavities, said stationary die having apertures for receiving the reduced end portions of said core pins and having recesses for forming projections on the sprue so as to yieldably retain the sprue during the movement of the movable die section to open position;

means for adjusting the core pins axially;

means for actuating the movable die to open and closed positions;

a shearing blade mounted on said stationary die section for movement transversely of said axis along a plane parallel and adjacent to the sprue on said stationary die section;

cam means mounted on said movable die section;

means actuated by said cam means in response to the first portion of the movement of said movable die section to open position for advancing said shear blade in said plane to effect the shearing of the sleeves from the sprue; and means operable in response to the latter portion of the movement of said movable die section to open position for ejecting the sprue from the stationary die section after the shearing of the sleeves.

9. An apparatus as defined in claim 8 including the provision of means for effecting the oscillatory movement of said shear blade in said plane during the advancing movement of said shear blade.

References Cited by the Examiner

UNITED STATES PATENTS 2,940,121 6/1960 Sherman _____ 18—5
3,003,187 10/1961 Schaich _____ 264—163 X J. SPENCER OVERHOLSER, *Primary Examiner.*

WILBUR L. McBAY, *Examiner.*